Jan. 29, 1957     D. L. FARMER     2,779,364
VENEER CLAMP
Filed May 6, 1953
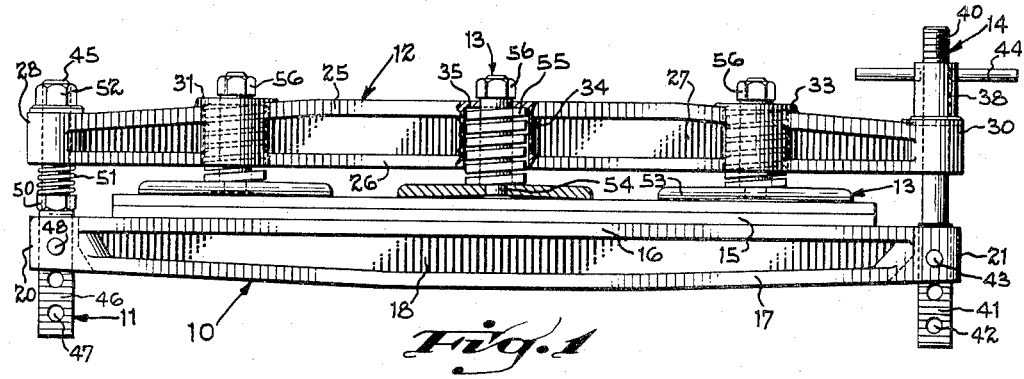
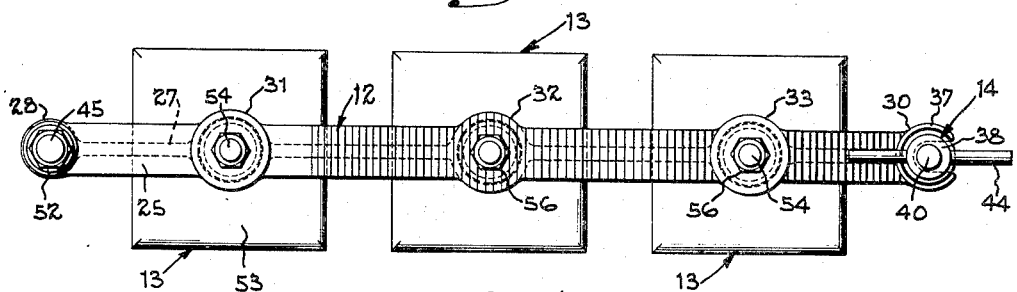
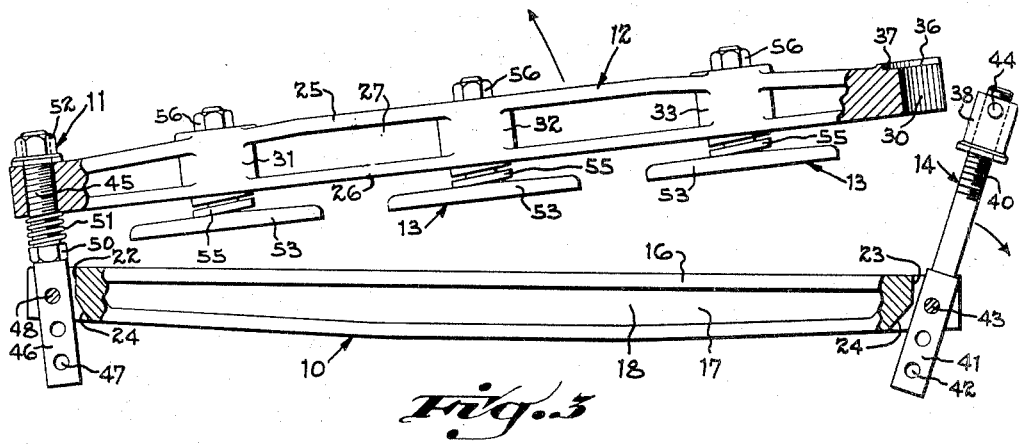
INVENTOR.
Delbert L. Farmer
BY
Wood, Herron & Evans
ATTORNEYS.

United States Patent Office 2,779,364
Patented Jan. 29, 1957

2,779,364

VENEER CLAMP

Delbert L. Farmer, Norwood, Ohio, assignor to The Cincinnati Tool Company, Cincinnati, Ohio, a corporation of Ohio Application May 6, 1953, Serial No. 353,286

2 Claims. (Cl. 144—281)

This invention relates to clamps, and is particularly directed to a clamp for applying pressure over a substantial area of a large sheet of material.

There are many manufacturing operations today in which it is desirable to glue, or otherwise secure together, two or more pieces of material of relatively large dimensions. For example, in the manufacture of kitchen sinks and tables, bar tops and the like, a thin sheet of plastic material, such as formica, is secured to a relatively heavy backing board. The size of the pieces being joined will of course vary, but it is not uncommon to join together pieces ten feet in length and two or more feet in width. In such an operation, the plastic sheet is secured to the underlying board by a special mastic, or adhesive compound, and in order to secure a good bond it is desirable to apply pressure over substantial portions of the sheet. The application of thin veneer sheets to boards also involves the same problem of applying clamping pressure over substantial areas.

Previously, there has been no clamp available for doing this in a completely satisfactory manner. In practice, the two pieces of material have been held together while the adhesive sets, by means of a plurality of conventional C clamps, spring clamps or the like, applied about the periphery of the work. If a sufficiently large number of clamps is used, the marginal portions of the work are satisfactorily held together. However, the central area, where the clamps cannot reach, is not under any appreciable pressure, and consequently, an inferior bond is obtained.

In some cases it is the practice, especially if the work is very wide, to extend a length of board across the work, clamping the board at either end. In this manner, a certain amount of pressure is applied by the board to the central portion of the work, as well as to its edges. However, it is not possible, even by this method, to provide a substantially uniform pressure across the entire width of the work from one edge to the opposite edge. For, only the ends of a board are clamped, and since the board is slightly flexible its intermediate portion will give somewhat, and will therefore exert a lower pressure on the center of the work than is supplied to its edges.

There are other disadvantages to employing a series of clamps, either alone or in combination with boards or other elements. In the first place the application of a large number of individual clamps consumes a substantial amount of time. This is especially true where additional members, such as lengths of board, must be fitted across the work in order to apply some pressure to the center. Furthermore, it is extremely difficult to adjust and space the clamps so that a substantially uniform pressure is applied even to those areas of the work to which the clamps can be attached. One reason for this difficulty is that the jaws of conventional clamps are of relatively small size, and consequently, provide small areas of concentrated pressure rather than extensive areas of somewhat more moderate pressure.

The principal object of the present invention is to provide a clamp adapted to apply a substantially uniform pressure over a large area, extending completely across a wide surface. More particularly, the present invention is predicated upon the concept of mounting a plurality of spaced clamping heads on one of two elongated arms. The arms are adapted to span the opposite sides of the work, and are pivotally interconnected at one end and releasably secured at the opposite end.

One of the arms which I shall term the cross bar, extends across the undersurface of the work; while the second, or pivot arm, extends over the work. The pivot arm carries the plurality of clamping heads, and can be brought into a position in which it lies parallel to the cross bar with the clamping heads in engagement with the upper work surface. The means pivotally interconnecting one end of the arms, and the means releasably securing their other end are also arranged so that the spacing between the arms can readily be adjusted. By drawing the ends of the cross bar and pivot arm closer together, the material being joined is compressed between the clamping heads and cross bar.

One of the principal advantages of this construction is the ease with which the clamp may be applied to and removed from the work. The clamp is applied by placing the cross bar beneath the work and rotating the pivot arm over the work to bring all of the clamping plates into engagement with the upper work surface. Then the free ends of the pivot arm and cross bar are secured together and finally both ends of the arms are forced together, automatically applying pressure to the work beneath each of the clamping plates. No separate adjustment need be made on any of the clamping heads since the tightening of the pivot arm and cross bar ends automatically sets each of the individual heads. In order to remove the clamp it is only necessary to release the free ends of the pivot arm and cross bar, swinging the arms free from contact with the work. Then the arms and clamping heads are withdrawn as a unit.

In a preferred embodiment of the veneer clamp the clamp plates are of relatively large cross section, for example, six inches square; and are resiliently mounted on the pivot arm. That is, the clamping plates or pressure plates depend from the arm and are slidably supported so that they can move toward or away from it. A heavy spring is effective to urge the plates downwardly away from the arm. However, the pressure plates are free to move back toward the arm against the compressive force of the spring. In addition, suitable means are provided for indicating the displacement of each pressure plate from its most advanced position. It will be appreciated that this displacement is correlated with the pressure applied by the plate, and therefore when each of the pressure plates is displaced an equal distance, a uniform clamping pressure is exerted by each of the clamping heads.

When applying the clamp to the work, the spacing of the pivot arm and cross bar at the pivot end of the clamp is adjusted until the pressure plate adjacent that end has been displaced substantially the desired amount. Then the spacing of the free ends of the arms is adjusted until the pressure plate adjacent that end is displaced the same amount as the plate at the opposite end. When these two pressure plates are properly adjusted each of the intermediate plates is similarly positioned and a substantially uniform pressure is applied by each of the heads.

Another important advantage of this invention is the rapidity with which the tool can be transferred from one piece of work to another, especially where the successive pieces of work to which the clamp is to be applied are all of the same thickness. Once the arm spacing at the pivot end of the clamp has been set, the pivot arm may be rotated without disturbing this adjustment. As explained above, in setting the clamping heads, after the pivot end is adjusted, then the free ends of the arms are drawn together until the pressure plates at either end are equally displaced. To transfer the clamp from one piece of work to another of the same thickness it is only necessary to release the open ends of the clamp arms, withdraw the clamp from the work, and then reapply it to a second work piece. The arm spacing at the pivot end will automatically be correct and by closing the free ends of the arms, until the clamping plates are equally displaced as before, a uniform pressure will be applied completely across the face of the work.

Other advantages of the present invention will be apparent from a consideration of the following detailed description of the drawing showing a preferred embodiment of the invention.

In the drawings:

Figure 1 is an elevational view, partially in section, of a veneer clamp constructed in accordance with this invention.

Figure 2 is a top plan view of the clamp shown in Figure 1.

Figure 3 is an elevational view, partly broken away, showing the clamp in a partially open position.

As shown in Figure 1, a preferred form of veneer clamp constructed in accordance with this invention includes a cross bar 10, a hinge arm 11, and a pivot arm 12 carrying a plurality of clamping heads 13. The pivot arm is rotatably secured to one end of the cross bar 10 by means of hinge arm 11; while a lock arm 14 is pivotally mounted on the opposite end of the cross bar for releasable engagement with the free end of the pivot arm. The cross bar 10 is disposed beneath the work 15, or if preferred, beneath the table holding the work, and pressure is applied to the work through clamping heads 13 by forcing the hinge arm and cross bar together at their ends.

More specifically, cross bar 10, is constructed of any suitable material such as cast iron, and is preferably of a cross section which is relatively rigid; for example, an I section including an upper flange 16, a lower flange 17, and an interconnecting web 18. Upper flange 16 is preferably a smooth planar surface adapted to provide a bearing surface for the underside of work 15.

Bosses 20 and 21 are provided on the two ends of the cross bar, the bosses being configurated to form upright slots 22 and 23. These slots include lower enlargements 24 for accommodating the hinge arm and lock arm during their pivotal movements, as will be explained below.

The pivot arm, like the cross bar, is preferably of a rigid cross section; one suitable form including flanges 25 and 26 interconnected by web 27. The pivot arm is preferably the same length as the cross bar, and like that bar, is provided with two end bosses 28 and 30. The pivot arm is also provided with a plurality of spaced bosses 31, 32, and 33 disposed intermediate the two end bosses 28 and 30.

The intermediate bosses are bored out to provide cylindrical spring receiving chambers 34 terminating in upper abutment shoulders 35. Boss 28 is provided with a cylindrical opening adapted to receive hinge arm 11, while boss 30 is provided with a vertical radial slot adapted to receive locking arm 14. The slot in boss 30 terminates at its upper edge in a shoulder 36, and peripheral flange 37 for engagement with head 38 of the locking bar.

Locking bar 14 preferably includes a threaded upper portion 40, and a flattened lower portion 41 which is provided with a plurality of openings 42 spaced longitudinally of the bar. A removable pin 43 is passed through one of the openings 42, and engages suitable apertures provided in boss 21. The pin may be held in place in any suitable manner such as by a nut, cotter pin, or the like. Head 38 threadably engages upper portion 40 of the bar, and is fitted with handle 44. The lower edge of head 38 is provided with a rim for engagement with flange 37, and shoulder 36 of the pivot bar.

The hinge arm 11 is of generally the same configuration as the locking bar, and includes a threaded portion 45 and a flattened portion 46 provided with a plurality of openings 47 spaced longitudinally of the arm. A removable pin 48 is inserted through suitable openings in boss 20, and passes through one of the apertures 47 in the hinge arm. Any suitable means may be provided for holding the pin in place.

A spring abutment surface is provided on the hinge arm, for example, by threading nut 50 over the threaded portion 45 until the nut engages the flattened portion 46. A coil spring 51 is placed over threaded portion 45, and is compressed between the nut 50 and lower flange 26 of the pivot arm; the pivot arm fitting loosely over the hinge arm. A nut 52 is inserted over the pivot arm, and threadably engages the hinge arm. By threadably adjusting nut 52, the spacing between the pivot arm and cross bar can readily be adjusted.

Each clamping head 13 includes clamping plate 53 mounted upon the end of a shaft 54, the shaft being press-fitted into an opening in the plate, or being secured thereto in some other suitable manner such as by welding. Clamping plates 53 are preferably relatively large; for example, six inches square. These large square plates provide good clamping elements since the area between the plates is reduced to a minimum. In the preferred embodiment, the plates are slightly dished; that is, they are of a concave configuration, so that when a pressure is exerted upon the central portion of the plate, the force is transmitted more or less evenly to the peripheral portions, and hence is spread over a large area.

A heavy coil spring 55 is inserted within the opening provided in each of the intermediate bosses 31, and is compressed between the upper surface of pressure plate 53 and shoulder 35. The springs are effective to urge the plates downwardly away from the pivot arm, movement of the plates in that direction being limited by means of nuts 56, threaded over the ends of shafts 54, and engaging the upper surfaces of bosses 31. In addition, nuts 56 function to provide a means for determining when a uniform pressure is applied by each of the clamping heads. This will be explained in greater detail below.

When applying the clamp to a workpiece, cross bar 10 is placed under the material, and pins 43 and 48 are inserted through the appropriate openings in the hinge arm and lock arm. The particular openings through which the pins are inserted are selected so that when the pivot arm is rotated into parallelism with the cross bar, the clamping plates will be spaced sufficiently far from the cross bar to accommodate the work. After the pins have been inserted, the pivot arm is rotated to bring the clamping plates into engagement with the workpiece, and lock arm 14 is rotated upwardly so that the head 38 is brought into engagement with boss 30.

Next, nut 52 at the pivot, or adjusting end, of the clamp is tightened down until the nut on the clamping head nearest that end is displaced from its associated boss the desired distance. Then head 38 on the lock arm 14 is turned down by means of handle 44 until the nut of the clamping head adjacent the free end of the clamp arms is spaced a similar distance from its boss. The displacement of each of the nuts from the top of its associated boss indicates the amount of compression of the associated spring, and consequently the amount of force applied by the pressure plate. So long as the springs are compressed the same amount, each of the pressure plates exerts substantially the same pressure upon the workpiece.

Since the cross bar and pivot arm are rigid, when the ends of the arms are spaced so that two endmost pressure heads are properly displaced, the remaining pressure heads will exert substantially the same force as the end plates, and a uniform pressure will be exerted across the entire width of the workpiece. Obviously, as many clamps as needed can be placed in side by side relationship to exert clamping pressure over the entire length of the work as well as over its width.

The adjusting arrangement which has been described is particularly useful when the clamp is to be reused on successive pieces of work of the same dimensions. Once the pivot end of the clamp has been adjusted so that the adjacent pressure plate exerts the desired amount of pressure, the clamp can be transferred without any adjustment of nut 52 on the pivot arm. It is only necessary when shifting the clamp from one workpiece to another to disengage head 38 from boss 30 by threading the head outwardly over the locking arm, and then pivoting the locking arm outwardly away from the free end of the pivot arm. Pivotal movement of the hinge arm and pivot arm does not affect the arm spacing adjustment determined by the position of nut 52. When reapplying the clamp, the cross bar is inserted under the work as before, and the pivot arm is rotated to bring the pressure plates into engagement with the opposite work surface. Finally the locking arm 14 is rotated back into engagement with the pivot arm, and head 38 is run down until the spacing of the bolt on the clamping head adjacent the locking arm is the same as that on the head adjacent the hinge arm. When this one adjustment is completed, a uniform pressure is exerted by each of the clamping plates.

Having described my invention, I claim:

1. A veneer clamp comprising a cross bar adapted to span a workpiece, a hinge arm pivotally secured to one end of said crossbar, a pivot arm mounted on said hinge arm in spaced relationship with said cross bar, a plurality of clamping heads carried by said hinge arm, each of said clamping heads including a shaft reciprocally mounted relative to the pivot arm, a pressure plate carried by said shaft, a spring compressed between said pressure plate and said pivot arm, said spring being effective to urge said pressure plate away from said pivot arm and indicating the displacement of said plate from said pivot arm, and a member carried by said shaft for limiting the travel of said pressure plate by engagement with the pivot arm, said member also being effective to provide a visual indication of the displacement of said pressure plate, a locking bar pivotally mounted upon the end of said cross bar remote from said hinge arm, said locking bar being adapted for releasable engagement with the free end of said pivot arm remote from the hinge arm, and means carried by said locking bar for adjusting the position of the free end of said pivot arm relative to the adjacent end of the cross bar.

2. A veneer clamp comprising a cross bar adapted to span a workpiece, a hinge arm configured to form a plurality of vertically spaced pin receiving apertures, a pin passing through one of said apertures, said pin being in engagement with one end of said cross bar, a pivot arm mounted on said hinge arm in spaced relationship with said cross bar, said pivot arm being adapted for sliding movement along said hinge arm, a spring carried by said hinge arm and in engagement with said pivot arm, an adjustment nut threadedly engaging said hinge arm in abutment with said pivot arm, said nut being adapted to force said pivot arm along the hinge arm against the spring pressure to vary the spacing between the pivot arm and the cross bar, a plurality of clamping heads carried by said hinge arm, each of said clamping heads including a shaft reciprocally mounted relative to the pivot arm, a pressure plate carried by said shaft, a spring compressed between said pressure plate and said pivot arm, said spring being effective to urge said pressure plate away from said pivot arm, and a member carried by said shaft for limiting the travel of said pressure plate by engagement with the pivot arm, said member also being effective to provide a visual indication of the displacement of said pressure plate, a locking bar pivotally mounted upon the end of said cross bar remote from said hinge arm, said locking bar being adapted for releasable engagement with the free end of said pivot arm remote from the hinge arm, and means carried by said locking bar for adjusting the position of the free end of said pivot arm relative to the adjacent end of the cross bar.

References Cited in the file of this patent

UNITED STATES PATENTS

| | | |
|---|---|---|
| 585,906 | Carter | July 6, 1897 |
| 828,069 | Steger | Aug. 7, 1906 |
| 1,706,675 | Osgood | Mar. 26, 1929 |
| 2,189,277 | Anderson | Feb. 6, 1940 |
| 2,525,204 | Calabro | Oct. 10, 1950 |
| 2,644,355 | Greco | July 7, 1953 |